United States Patent
Serafin

[11] 3,803,601
[45] Apr. 9, 1974

[54] INCOHERENT TURBULENCE DETECTOR
[76] Inventor: Robert J. Serafin, 1790 Ridge Rd., Highland Park, Ill. 60035
[22] Filed: Mar. 19, 1973
[21] Appl. No.: 342,649

[52] U.S. Cl. ............................................. 343/5 W
[51] Int. Cl. ............................................. G01s 9/02
[58] Field of Search ................................. 343/5 W

[56] References Cited
UNITED STATES PATENTS
3,646,555   2/1972   Atlas .................................. 343/5 W
3,341,844   9/1967   Sweeney ............................. 343/5 W Primary Examiner—Malcolm F. Hubler
Attorney, Agent, or Firm—R. S. Sciascia; R. J. Miller

[57] ABSTRACT

The invention disclosed herein provides an improvement on existent incoherent turbulence detectors by providing predetermined frequency shift in the existing detector circuitry to obtain improved resolution.

4 Claims, 4 Drawing Figures

MODIFIED DETECTOR OUTPUT $= \frac{\lambda^2}{4}(\delta_o + f_1 - f_2)^2$

MODIFIED DETECTOR OUTPUT $= \frac{\lambda^2}{4}(\delta_o + f_1 - f_2)^2$

INCOHERENT TURBULENCE DETECTOR

The invention described herein may be manufactured and used by or for the Government of the United States of America for governmental purposes without the payment of any royalties thereon or therefor.

There has long been a need for determining turbulence in the atmosphere. Several systems have been developed for such determination and among them is bouncing of radar signals off of clear air turbulence and other turbulence and reading the echoes to determine existence or non existence of such turbulence. The use of high speed aircraft operating in the air at the height of the jet streams has caused many serious situations both for pilots and passengers in such aircraft.

It is therefore an object of this invention to provide a clear air turbulence detector.

It is yet a further object of this invention to provide an improved incoherent turbulence detector.

It is still a further object of this invention to provide an improved clear air incoherent turbulence detector including improved circuitry incorporating intentional phase shift.

An yet a further object of this invention is to provide an improved incoherent turbulence detector comprising; an input circuitry for receiving radar signals; an IF amplifier circuit to receive the received signals; a frequency shifting circuit coupled to receive signals from the IF amplifier; a first power splitter circuit coupled to receive signals from the frequency shift circuit; a delay circuitry for receiving a signal from the IF amplifier and coupled to a second power splitter circuit; a summing circuit coupled to receive signals from the first and second power splitter circuits; first, second and third detectors respectively connected to receive signals from the first power splitter circuit, the summing circuit and the second power splitter circuit; first, second and third sample and holding circuits coupled respectively to the first, second and third detectors; first, second and third R meters coupled respectively to the first second and third sample and holding circuits; first and second low pass filters coupled respectively to first and third sample and holding circuits; and, an arithmetic unit coupled to receive the output from the first and second low pass filters and the first, second and third R meters to provide a detected output to display the return signals to indicate existence of turbulence.

Other objects, advantages and novel features of the invention will become apparent from the following detailed description of the invention when considered in conjunction with the accompanying drawings wherein.

PRIOR ART

Described here is a modification to the incoherent turbulence detector conceived by Atlas and described by Atlas and Srivastava (1969, 1971). The technique of Atlas uses the fluctuations of envelope detected signals in two separated range gates and fluctuations of the envelope of the sum signal to obtain estimates of the quantity $(\bar{v}_1 - \bar{v}_2)^2$ where $\bar{v}_1$ and $\bar{v}_2$ are the mean doppler velocities of the meteorological particles sampled by the two range gates. Non zero values of $\bar{v}_1 - \bar{v}_2$ are indications of spatial variations of the wind velocity and hence non zero values of $\bar{v}_1 - \bar{v}_2$ are indications that turbulence is present. The difference velocity squared is related to the turbulence structure function, a measure of the intensity of the turbulence and its spatial scales. It has been shown both theoretically and experimentally that the turbulence detector so described exhibits relatively poor performance for small values of $(\bar{v}_1 - \bar{v}_2)^2$. Moreover, it has been shown that small changes in $(\bar{v}_1 - \bar{v}_2)^2$ are more easily detected at large values of $(\bar{v}_1 - \bar{v}_2)^2$ than at small values. Thus by artificially introducing a bias velocity $v_o$ it is possible to substantially improve the ability of the detector to detect light turbulence.

The criterion of performance used is the statistical mean square error of variance of the estimates of the structure function. Without going into theoretical detail let it suffice to say here that the quantity of interest cannot be measured exactly because of time limitations placed upon the measurements. Because the signals, from which the structure function is estimated, are random functions of time, it is not possible in any finite time internal to measure the quantity $(\bar{v}_1 - \bar{v}_2)^2$ exactly. The research conducted, however, illustrated that the variance of this quantity is in fact dependent not only on the measurement time but also on its mean value. Detailed investigation of this information led to the proposed modification described below.

Figure 1:
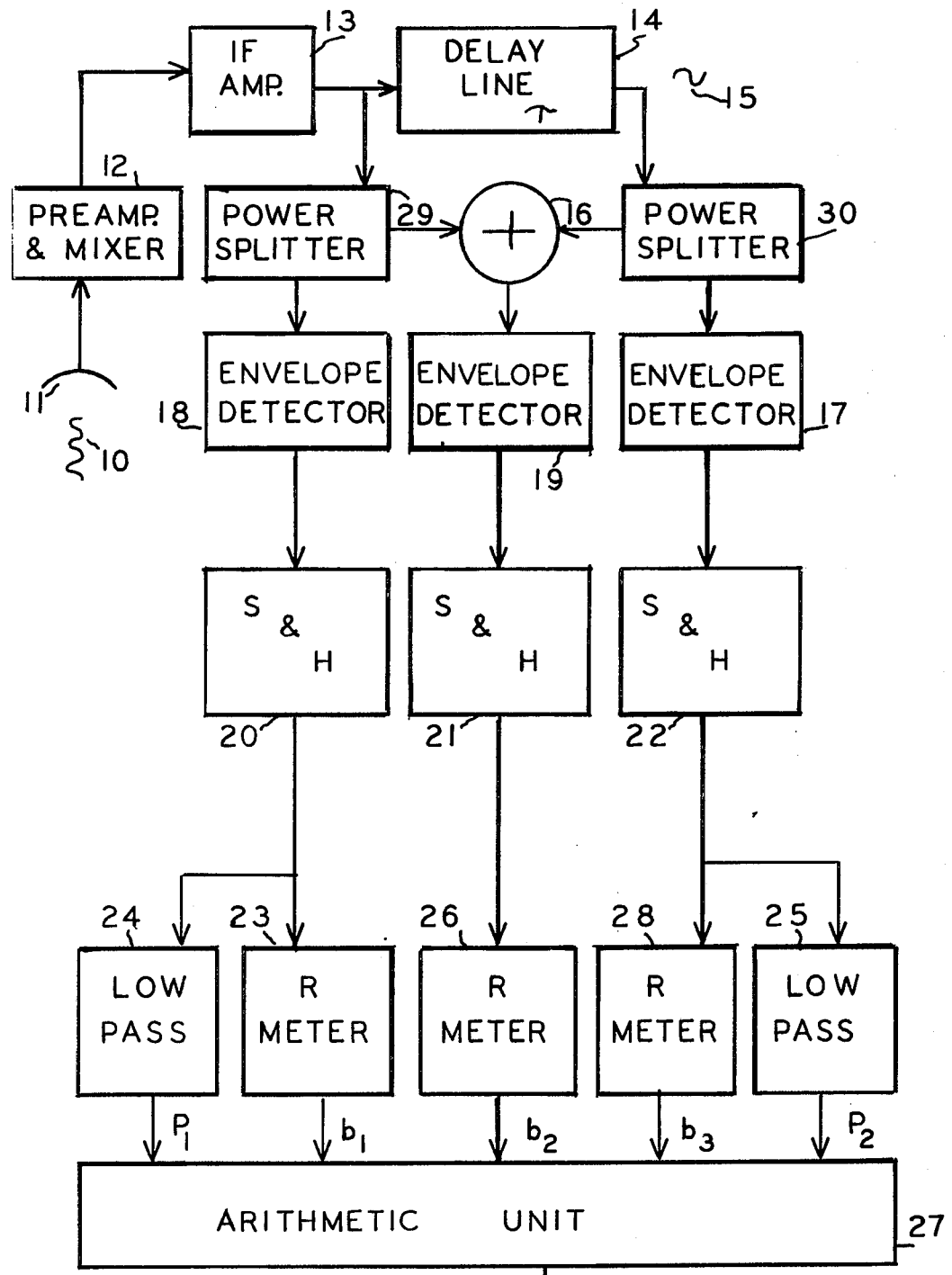
FIG. 1 is a diagram presenting the prior art.

FIG. 1, shows in block diagram form the method of Atlas. An incoming echo radar signal 10 is received by an antenna 11, fed thru a preamplifier and mixer 12 to an IF amplifier 13. Typically the intermediate frequency $f_{IF}$ is in the order of 30 MHz to 60 MHz. The bandwidth of all IF processing must be of the order of the reciprocal of the transmitted pulse width and typically is of the order of 0.5 MHz to 10 MHz. The IF delay line 14 permits simultaneous processing of signals separated a duration $\tau$ corresponding to a spatial separation $p$ given by $$p = c\tau/2$$

where $c$ is the velocity of light. The output of the delay line 14 provides a delayed signal 15 which is fed thru a power splitter 30 to a summing circuit 16 and a detector circuit 17. The undetected signal from the IF amplifier 13 is also fed thru a second power splitter 29 to the summing circuit 16 and to a second detector 18. The output of the summing circuit 16 is fed to a third detector 19. The individual output of detectors 17, 18, and 19 which are envelope detector signals are fed to three sample and hold circuits 20, 21 and 22. The sample and hold circuits are individually coupled to feed their outputs to three R meters similar to those described by Rutkowski and Fleisher in 1955 that count the number of level crossings of a random function of time and for the signals of interest gives an output proportional to the bandwidth of the signal. Clearly, the bandwidth of the summed signal 16 is dependent upon the mean difference velocity between spatially separated gates and it is this dependence which is exploited in the technique of Atlas. The output of the sampling and holding circuit 20 is fed to both R meter 23 and low pass filter 24. The low pass filter 24 averages the detected signals and provides voltages proportional to the signal powers in the two gates. Similarly a low pass filter 25 is coupled to sample and hold circuit 22. The output of the meters 23, 26, 28 and the filters 24, 26 are shown in the figures as $P_1$, $P_2$, $b_1$, $b_2$ and $b_{12}$. These are all fed to an arithmetic unit 27. $P_1$ and $P_2$ are the average power in the delayed and undelayed signals; $b_1$ and $b_2$ are doppler bandwidths in power splitters designated as 29, 30 and $b_{12}$ is the doppler bandwidth of the summed signal. Thus the quantities are sufficient for calculation of the expression of Atlas, namely, $$(\bar{v}_1 - \bar{v}_2)^2 = \lambda^2/4 \, (\bar{f}_1 - \bar{f}_2)^2$$
$$= \lambda^2/4 \, (P_1 + P_2)/P_1 P_2 \, [b_{12}^2 \, (P_1+P_2) - b_1^2 P_1 - b_2^2 P_2]$$

where $\lambda$ is the radar wave length and $\bar{f}_1$ and $\bar{f}_2$ are the mean doppler shifts in gates 1 and 2.

It is worthwhile to note here, however, the important features of Atlas' method, namely that because the detector employs only envelope detection a coherent reference oscillator is unnecessary and the method will work with any incoherent radar. Even magnetron pulse to pulse instabilities do not inhibit the operation of the detector because the device is sensitive only to the difference frequency between the signals in the two gates and does not require pulse to pulse coherence. In short the signals in the two gates are coherent, with respect to one another and hence one may be thought of as a reference for the other even though one transmitted pulse is not coherent with preceeding or succeeding pulses.

INVENTION

Figure 2:
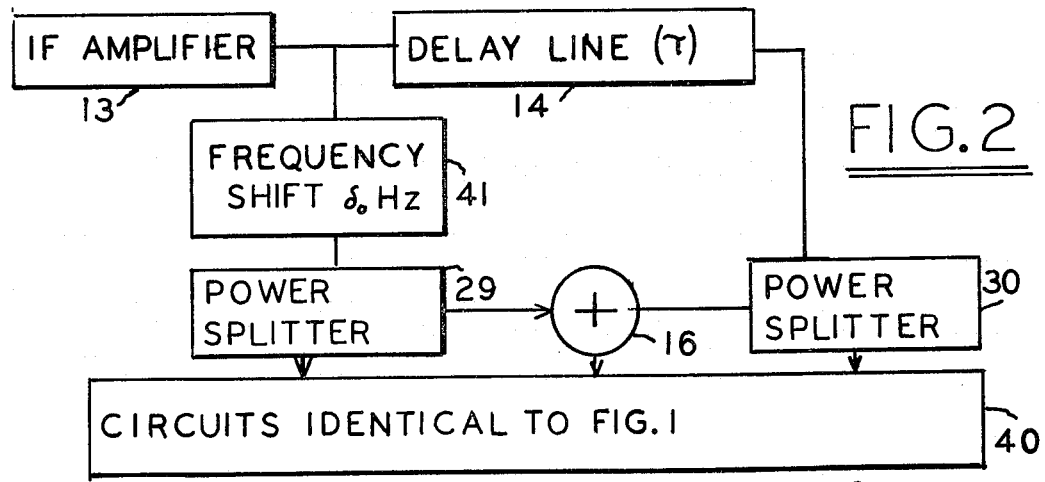
FIG. 2 is a modification of the prior art that incorporates the invention.

The improvement of this disclosure is the introduction of an intentional frequency shift $\delta_o$ between the signals in power splitters 29, 30 of FIG. 1. This is accomplished thru the modification shown in FIG. 2 where IF amplifier 13 and delay line 14 are similar to those in FIG. 1 as are power splitters 29, 30 and summing circuit 16. The block diagram designated as 40 represents circuits similar to that in FIG. 1. The addition includes the addition of the frequency shift circuit 41 which is introduced into the first channel between the IF amplifier 13 and power splitter 29. The selection of frequency shift is somewhat arbitrary but it must be consistent with the sample rate of the radar pulse repetition frequency (PRF). Actually, the highest frequency permitted by the sampling theorem is one half the sampling rate. However, if both positive and negative values of $\bar{f}_1 - \bar{f}_2$ are to be accommodated, $\delta_o$ must be less than the theoretical maximum. One fourth of the PRF is a logocial choice permitting symmetry about $\delta_o$. A typical value for the PRF is about 1,000 Hz and hence frequency shifts of the order of 250 Hz are indicated.

Figure 3:
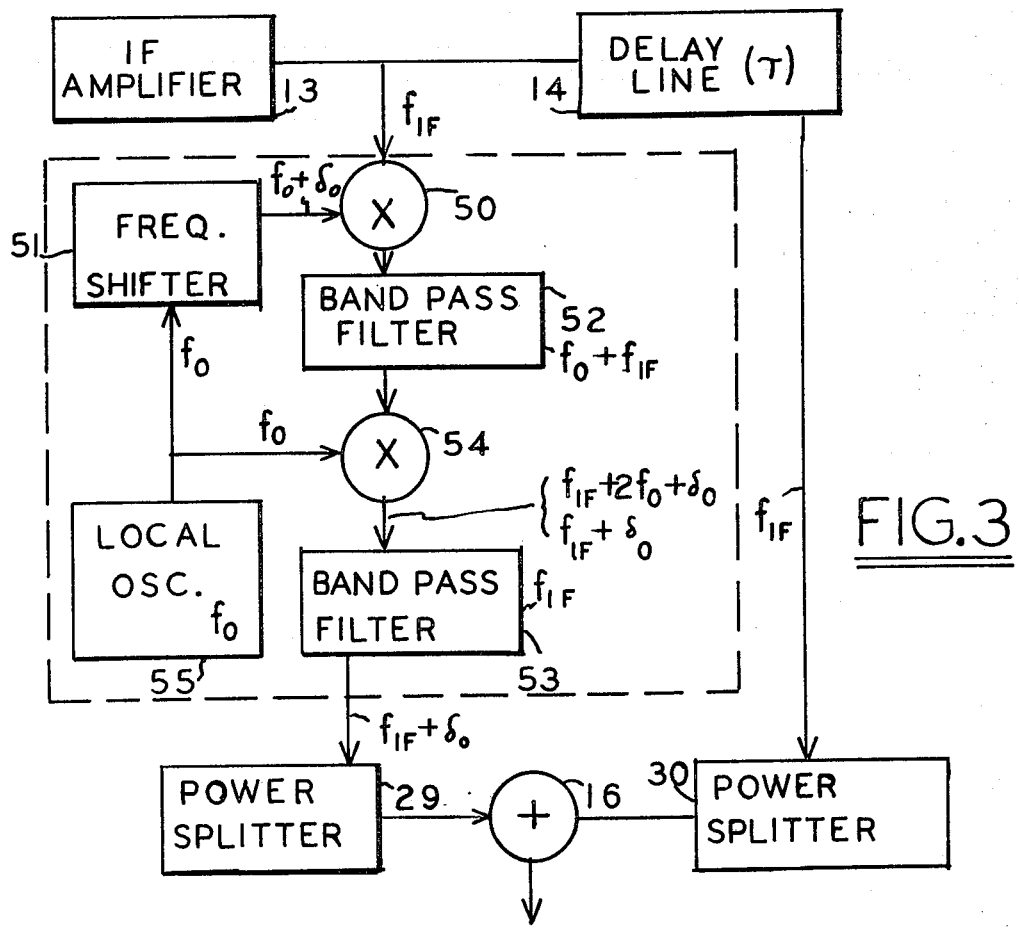
FIG. 3 is a detailed block diagram of the frequency shifting techniquss utilized in the invention.

One method of obtaining the desired steps is shown in FIG. 3 wherein the IF amplifier 13 delay line 14 summing circuit 16 and power splitters 29, 30 are similar to those of the previous figures. The undelayed IF signal is represented by $f_{IF}$ and is fed into a circuit 50. A single side band circuit 51 produces a signal $f_o + \delta_o$ which is fed to mixer 50 and to first band pass filter 52. The output of band pass filter 52 is fed to mixer 54. Mixer 54 also receives the local oscillator frequency signal $f_o$ from local oscillator 55 and its output is fed to band pass filter 53.

The IF signal is mixed with a sine wave of frequency $f_o + \delta_o$ yielding sum and difference components at $f_{IF} + f_o + \delta_o$ and $f_{IF} - f_o - \delta_o$. The band pass filter selects the former, the upper sideband, Note that $f_{IF}$ and $f_o$ should be of the same order of magnitude typically several MHz while $\delta_o$, of the order of hundreds of Hz, is considerably smaller than the receiver bandwidth. Thus $\delta_o$ need not be considered in designing the band pass filters. In the second step the upper sideband is mixed with a sine wave of frequency $f_o$ again generating sidebands at $2f_o + f_{IF} + \delta_o$ and $f_{IF} + \delta_o$. In this instance the latter lower sideband is selected by a band pass filter thus yielding a signal with the desired frequency shift, $\delta_o$. Similarly all signal frequencies passed by the receiver IF amplifier will have been shifted by exactly $\delta_o$.

Figure 4:
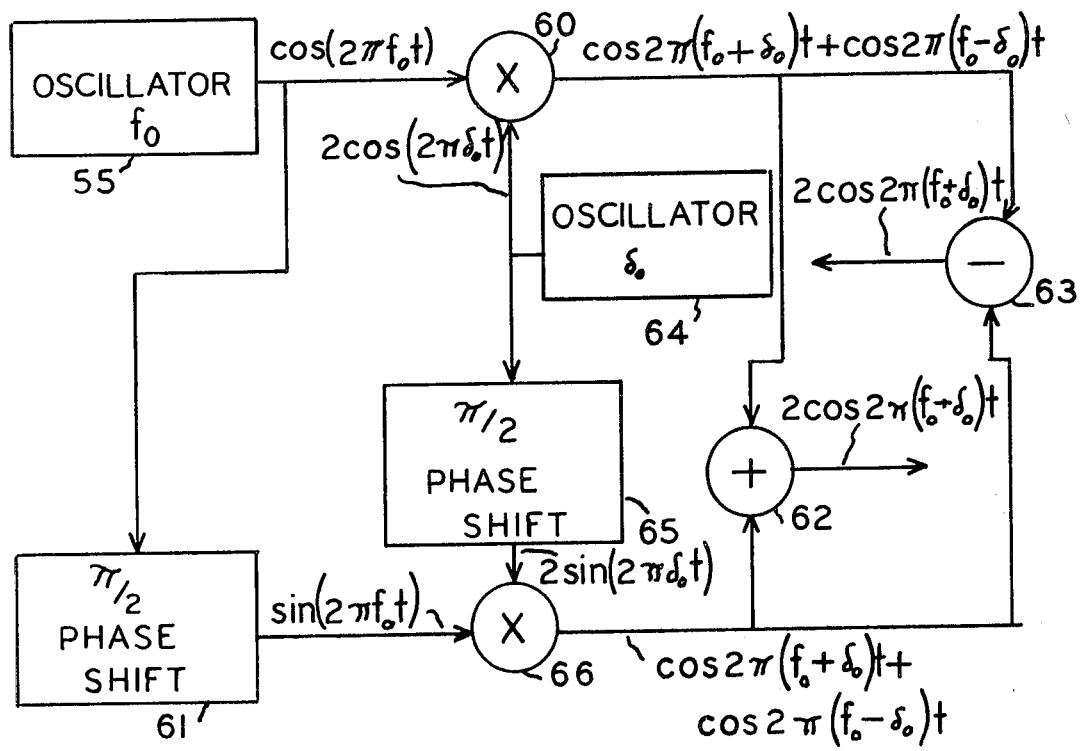
FIG. 4 is a method of obtaining local oscillator reference signals separated by 8o Hz.

It is apparent that, if the frequency shifting technique of FIG. 3 is to be realized, $f_o$ and $f_o + \delta_o$ must be synthesized. While this problem is conceptually trivial, its physical realization requires some care because $\delta_o$ is so small compared to $f_o$. A variety of methods including commerical frequency synthesizers may be used to obtain the two references. One rather simple method using conventional signal sideband modulation techniques is shown in FIG. 4. The $\pi/2$ phase shifters provide the sine and cosines of both $2\pi\delta_o t$ and $2\pi f_o t$.

Local oscillator 51 is an output signal designated Cos ($2\pi$fot) which is fed to mixer 60 and in addition to a phase shifter 61. The output of mixer 60 is fed to a summing circuit 62 and a differencing circuit 63. A second oscillator 64 has its output Cos $2\pi\delta_o t$ fed to circuit 60 and a second phase shifter 65. The output of the two phase shifters 61 and 65 are fed to a circuit 66 and in turn to summing and differencing circuits 62 and 63.

After mixing in two mixers the sum and difference frequencies are obtained in both channels except that the signs of the terms are not identical in the two channels. It is clear that the sum of the channels yields the down shifted carrier or lower sideband while the difference of the two mixed signals gives the upper sideband. Using such a method it can be guaranteed that oscillator instabilities in $f_o$ will not swamp out the desired shift $\delta_o$. In short the two frequencies $f_o$ and $f_o + \delta_o$ will always be exactly $\delta_o$ Hz apart in spite of fluctuations in $f_o$.

Obviously many modifications and variations of the present invention are possible in the light of the above teachings. It is therefore to be understood that within the scope of the appended claims the invention may be practiced otherwise than as specifically described.

I claim:

1. An improved incoherent turbulence detector comprising:
   a. input circuitry for receiving radar signals;
   b. an IF amplifier circuit to receive said received signals;
   c. a frequency shifting circuit coupled to receive signals from said IF amplifier;
   d. a first power splitting circuit coupled to receive signals from said phase shift circuit;
   e. delay circuitry for receiving a signal from said IF amplifier and coupled to a second power splitting circuit;
   f. a summing circuit coupled to receive signals from said first and second power splitting circuits;
   g. first, second and third detectors respectively connected to receive signals from said first power splitting circuit; said summing circuit and said second power splitting circuit;

h. first, second and third sample and holding circuits coupled respectively to said first, second and third detectors;

i. first, second and third R meters coupled respectively to said first, second and third sample and holding circuits;

j. first and second low pass filters coupled respectively to first and third sample and holding circuits; and k. an arithmetic unit coupled to receive the output from said first and second low pass filters and said first, second and third R meters to provide a detected output to display the return signals to indicate existence of turbulence.

2. The improved incoherent turbulence detector of claim 1 wherein there is included a local oscillator circuit to generate frequency shift in said frequency shifting circuit.

3. The improvement of claim 2 wherein said frequency shifting circuit includes a local oscillator circuit connected to a mixing circuit wherein a signal from said local oscillator is combined with a signal from an IF amplifier and fed thru a first band pass filter.

4. The improvement of claim 3 wherein there is provided a second circuit for combining the output from said first band pass filter and said local oscillator to provide a second mixed signal which is coupled to a second pass band filter.

* * * * *